Oct. 10, 1950 F. SAYERS 2,524,996
ADJUSTABLE PRESSURE REGULATOR
Filed April 10, 1947

INVENTOR
FREDERICK SAYERS
BY
Wheeler, Wheeler & Wheeler
ATTORNEYS

Patented Oct. 10, 1950

2,524,996

UNITED STATES PATENT OFFICE 2,524,996

ADJUSTABLE PRESSURE REGULATOR

Frederick Sayers, Fort Atkinson, Wis., assignor to Moe Brothers Manufacturing Company, Fort Atkinson, Wis., a corporation of Wisconsin Application April 10, 1947, Serial No. 740,626

3 Claims. (Cl. 137—53)

This invention relates to improvements in adjustable pressure regulators of the relief valve type. The device as herein disclosed is particularly designed for use in connection with domestic pressure cookers.

It is a primary object of the invention to provide a novel and improved mechanism whereby a given weight or mass may be applied to varying cross sections of a tapered vent to regulate the amount of pressure which must develop in the vent before steam will escape therefrom. More specifically stated, it is my purpose to provide a construction in which a series of valve members of different diameters are telescopically advanced and retracted with respect to each other for successively engaging the tapered wall of a steam vent at differently diametered portions thereof. An important feature of the invention is the means by which the telescopically associated valve members may be sequentially projected by the rotation of one portion of the body of the apparatus with respect to another portion thereof. A very important advantage of the construction as herein disclosed lies in the fact that the adjustment can be made without removing the body from the vent.

A further object of the invention is to protect the user of the device from injury by steam passing the valve, such steam being conducted through escape ducts downwardly toward the top of the pressure cooker, where it is harmlessly dissipated at a point remote from an operator manipulating the regulating apparatus.

Still other objects of the invention will be more clearly apparent from the following disclosure thereof.

Figure 1:
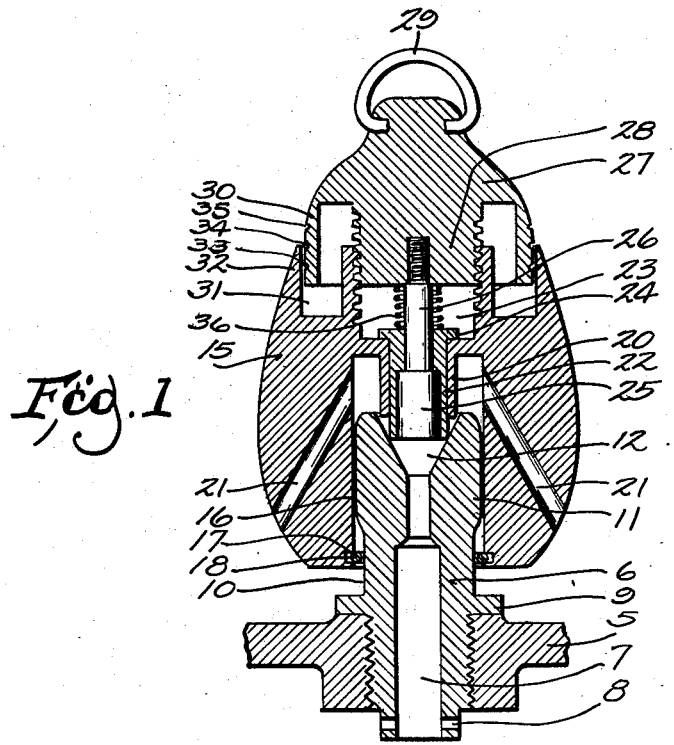
Fig. 1 is a view in vertical axial section through a device embodying this invention as it appears when applied to the steam vent of a pressure cooker.

A fragment of a pressure cooker cover is shown at 5. Into it is screwed a steam vent fitting 6 which has a bore 7 opening upwardly from its bottom end and communicating lateral bores 8 opening into the bore 7 below the cover 5 to admit steam thereto in the event that some of the material being cooked becomes lodged across the mouth of the bore 7.

A flange 9 on the vent fitting 6 seats against the top of the pressure cooker cover 5. Immediately above this flange, the fitting 6 is externally reduced in diameter at 10 for the impositive retention of the gauge body as will hereinafter be described. The enlarged head 11 of fitting 6 is provided with a conically tapered valve seat 12.

Coacting with the valve seat 12 are two or more telescopically related valves carried by a body 15 of substantial mass, the weight of which is imposed on any one of the valves selectively engaged with the valve seat. The body 15 has a bore at 16 fitting telescopically about the head 11 of the valve seat fitting 6. At its lower end, there is an undercut groove 17 in which a contractile spring 18 is disposed to retain the body 15 impositively on the valve seat stem. The head 11 is beveled at its upper and lower ends to facilitate the expansion of the contractile spring 18 when the body 15 is manipulated to and from position upon the stem. However, when the body is in place on the stem, the beveled shoulder at the lower end of the stem head 11 offers sufficient resistance to the contractile spring 18 so that the pressure cooker cover can be handled freely without danger of the body 15 being accidentally displaced from it. A positive lifting action by the operator is required to separate the parts.

The present device uses three telescopically related valves. The valve which is largest in diameter comprises a sleeve 20 integral with body 15 and projecting downwardly into the bore 16, coaxially therewith. From the space between the wall of bore 16 and the internally spaced valve sleeve 20 a plurality of ducts 21 open outwardly and downwardly to permit the escape of steam which passes the valve.

Telescopically slidable within valve sleeve 20 is an intermediate valve 22 which projects into the threaded socket 23 and is provided with a flange 24 which may seat against the bottom of such socket. Within the intermediate valve is an inner valve 25 having a stem 26 of reduced diameter. The intermediate valve 22 has a bore into which the cylindrical valve 25 is closely fitted and has a smaller bore through which the stem 26 is slidable.

The valve stem 26 of the smallest valve 25 is screw-threaded or otherwise fixed in the adjusting cap 27 of the body 15. The cap 27 has an internal boss at 28 having screw threads of high pitch complementary to those of the threaded socket 23 and body 15. A small bail 29 facilitates the handling of the assembly and the rotation of the cap 27 respecting body 15. The cap 15 has a skirt 30 receivable into an annular recess 31 of the body 15 within flange 32. The top margin of the flange serves as an indicator cooperative with a series of calibrating grooves 33, 34 and 35 to show the position of adjustment of the cap respecting the body.

Figures 2, 3, 4:
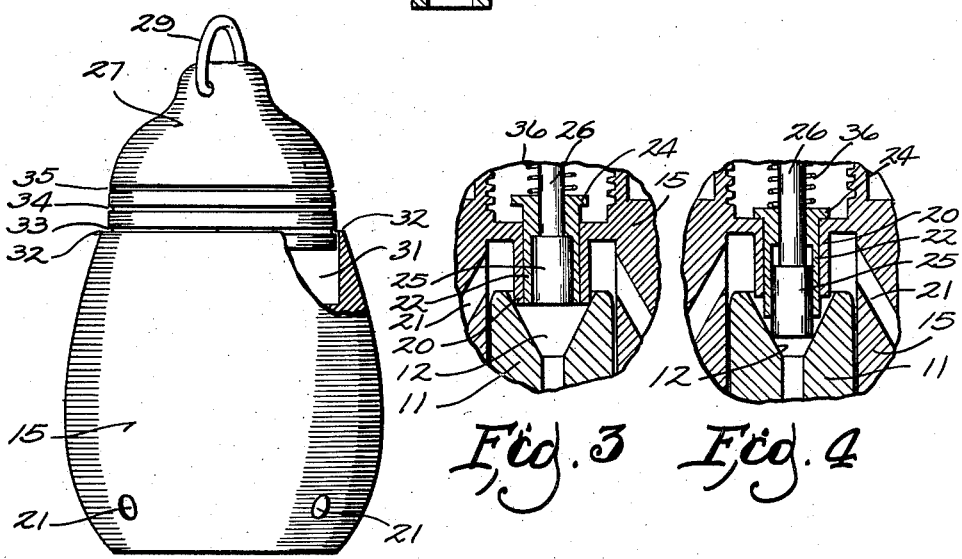
Fig. 2 is a view in side elevation of a device embodying the invention.
Fig. 3 and Fig. 4 are fragmentary detail views in section illustrating different valve positions from that shown in Fig. 1.

With the cap unscrewed to the position shown in Fig. 2, the lowest groove 33 registering with the margin of flange 32, the inner valve 25 rigidly connected by stem 26 with the cap will be drawn upwardly to its highest position respecting body 15 carrying with it the intermediate valve 22 against the pressure of compression spring 36, which is interposed between the cap 27 and the flange 24 of the intermediate valve. In this position of the parts, both the intermediate and inner valves being retracted, the outer or sleeve valve 20 will be exposed to contact the tapered seat 12 at a high level as shown in Fig. 3. The entire weight of body 15 and cap 27 and associated parts will be sustained from the fitting 6 by the valve 20. In this position of the parts, it will be apparent that any steam pressure developed in the container for which the part 5 represents a cover will be applied to the relatively large area represented by the overall diameter of the entire set of valves. Since the load or mass of the body 15 and its associated parts is a fixed amount, it will be apparent that a relatively small pressure in the container applied to this relatively large area will be sufficient to lift the valve set and body 15, thus permitting excess steam to escape through the ducts 21. For pressure cooker purposes, the amount of pressure required to release steam when the valve 20 is in use may be assumed to be of the order of five pounds.

If the regulator cap 27 is screwed downwardly respecting body 15 until the intermediate groove or calibration 34 registers with the rim 32, as shown in Fig. 1, the inner valve 25 will be lowered just sufficiently to permit the flange 24 of the intermediate valve 22 to seat against the bottom of recess 23 under the compression of spring 36. As clearly appears from Fig. 1, the entire weight of the apparatus is now imposed, through spring 36, on the intermediate valve and therethrough upon an intermediate point in the tapered seat 12. For pressure cooker purposes, this arrangement of the parts may be so calculated that the steam pressure now exerted upon a smaller area will have to be of the order of ten pounds before lifting the mass of body 15 regulating cap 27 and associated parts to permit the escape of steam through ducts 21.

If the regulating cap 27 be further screwed downwardly respecting body 15 until the top calibration 35 registers with the pointer or margin 32, the innermost valve 25 will now be advanced downwardly out of the intermediate valve 22 to engage the tapered seat 12 at a still lower lever and smaller diameter as shown in Fig. 4. The other two valves 22 and 20 are carried in the clear. With this greatly reduced diameter, still higher steam pressure in the vessel will be required to displace the regulator assembly and, in pressure cooker practice, the dimensions of the parts may be predetermined so that, for example, a pressure of fifteen pounds will be developed in the container before the body 15 and associated regulator parts will be displaced when the valve 25 is in use as shown in Fig. 4.

It will be noted that the constricting spring 18 which holds the regulator body and cap assembly to fitting 6 is normally positioned well below the shoulder of head 11 of such fitting so that it does not interfere with the slight rising of the assembly to permit the escape of steam through the ducts 21.

Due to the fact that the differentially diametered valve and valve seat elements include telescopically projected parts, together with means for projecting them sequentially, it is possible to adjust the apparatus for one pressure or another without lifting the apparatus from the supporting fitting and without releasing the pressure in the controlled container except in accordance with the adjustment of the telescopically related elements.

I claim:

1. In a device of the character described, the sub-combination which comprises a body provided internally with a tubular valve element, a second valve element telescopically movable within the tubular valve element, a regulator cap in screwthreaded connection with the body, and a connection from the cap for positively moving the second valve element in one direction respecting the first valve element, the said positive connection comprising a third valve element having a shoulder with respect to which the second valve element has lost motion, and a spring urging the second valve element toward said shoulder, said second valve element having means limiting movement in response to the spring whereby the third valve element may continue when the second is stopped by the limiting means.

2. In a device of the character described, a regulator comprising a body having a bore adapted to receive a headed fitting provided with a tapered valve seat, a valve sleeve fixed to said body and projecting into said bore for engagement with such a seat, an intermediate valve member telescopically slidable in said sleeve between advanced and retracted positions, a stop flange engageable with said body to limit the advance position of said intermediate valve, a spring urging said intermediate valve toward its said advance position, said intermediate valve being socketed, and a third valve reciprocable in the socket of the intermediate valve and provided with a stem extending through the intermediate valve, said third valve being adapted to be advanced beyond the intermediate valve in the position in which the intermediate valve is arrested by said stop means, and a regulating cap screwthreaded to said body and positively connected to the stem of the third valve and comprising means whereby the third valve may be advanced and retracted and the intermediate valve retracted, whereby the several valves may be selectively engaged with differentially diametered portions of said tapered seat.

3. A device of the character described comprising in combination a fitting having a restricted waist portion and enlarged head having a tapered shoulder at said waist portion, a conical valve seat in the head and a bore leading through the fitting to said seat, of a body having a bore in which the head of said fitting is reciprocable, said body being provided below said head with a contractile detent key relatively freely movable respecting the waist portion of the fitting but requiring expansion to pass said head, a threaded socket in the upper portion of said body in substantial alignment with said bore last mentioned, a regulating cap screwthreaded to said body within the socket, said body and cap having complementary skirt portions provided with calibrations indicative of the threaded position of the cap, an outer tubular valve member connected with said body and projecting into the bore of said body toward the seat of said fitting, an intermediate valve member reciprocable telescopically in the first valve member and having a flange adapted to seat at the bottom of said socket to limit its movement in a downward direction, a compression spring acting on the intermediate valve member and biasing it toward the position in which said flange engages the bottom of the socket, an inner valve member telescopically adjustable in the intermediate valve member and having a stem connected with said regulating cap, and a head for which the intermediate valve member is provided with a socket and shoulder, said cap, in its highest position respecting said body acting through said stem and shoulder to lift the intermediate valve member into the first valve member, leaving the first valve member to engage said seat, and in successively lower positions of said cap permitting the intermediate valve member to move to its limited position subject to the bias of said spring whereby it engages said seat in a differentially smaller diametered portion thereof, and in the lowest position of said cap being adapted to project the inner valve member beyond the intermediate valve member into engagement with said seat in a differentially smaller diametered portion thereof.

FREDERICK SAYERS.

REFERENCES CITED

The following references are of record in the file of this patent:

UNITED STATES PATENTS

| Number | Name | Date |
| --- | --- | --- |
| 293,685 | Thomas | Feb. 19, 1884 |
| 1,047,774 | Eynon et al. | Dec. 17, 1912 |
| 1,231,330 | Clark | June 26, 1917 |
| 1,778,114 | Mace | Oct. 14, 1930 |
| 2,320,360 | Grey | June 1, 1943 |
| 2,459,553 | Sullivan | Jan. 18, 1949 |

FOREIGN PATENTS

| Number | Country | Date |
| --- | --- | --- |
| 1,308 | Great Britain | Apr. 2, 1879 |
| 243,569 | Switzerland | Feb. 9, 1945 |